July 20, 1965             J. MERCIER             3,195,578
PRESSURE ACCUMULATOR
Original Filed April 17, 1959             2 Sheets-Sheet 1
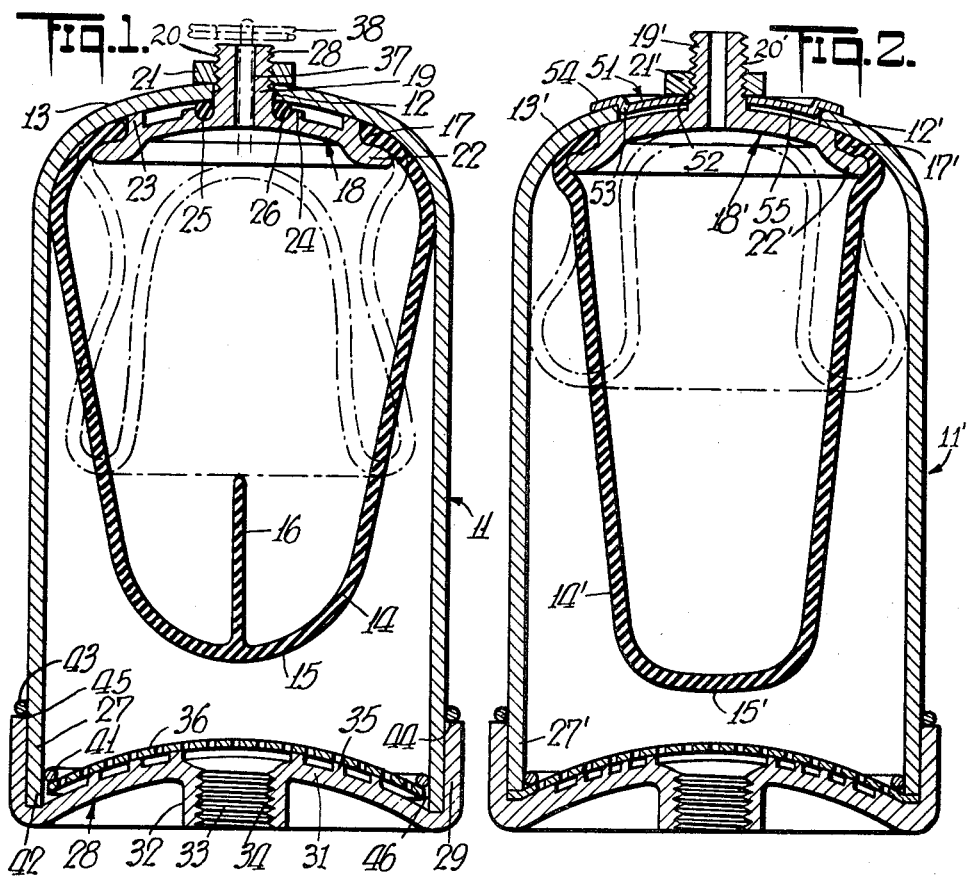
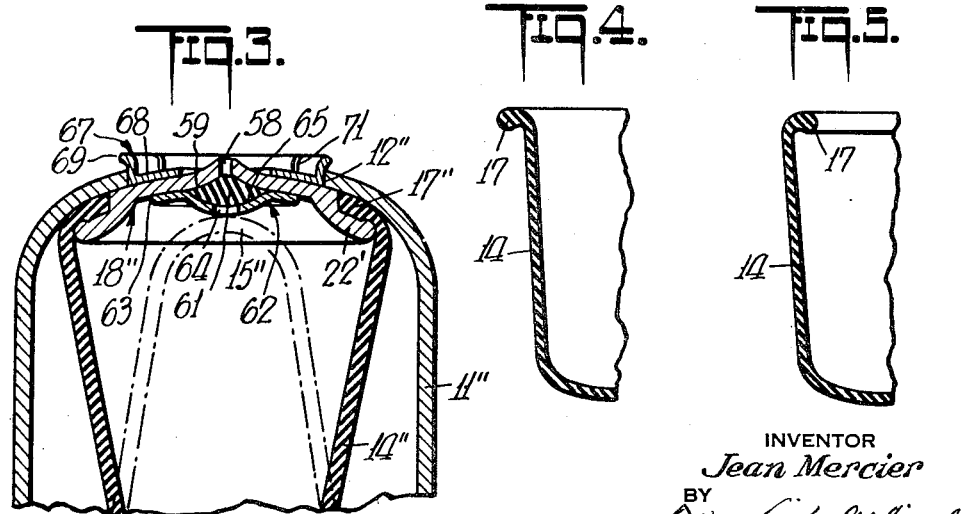
INVENTOR
*Jean Mercier*
BY
ATTORNEYS July 20, 1965  J. MERCIER  3,195,578
PRESSURE ACCUMULATOR
Original Filed April 17, 1959  2 Sheets-Sheet 2
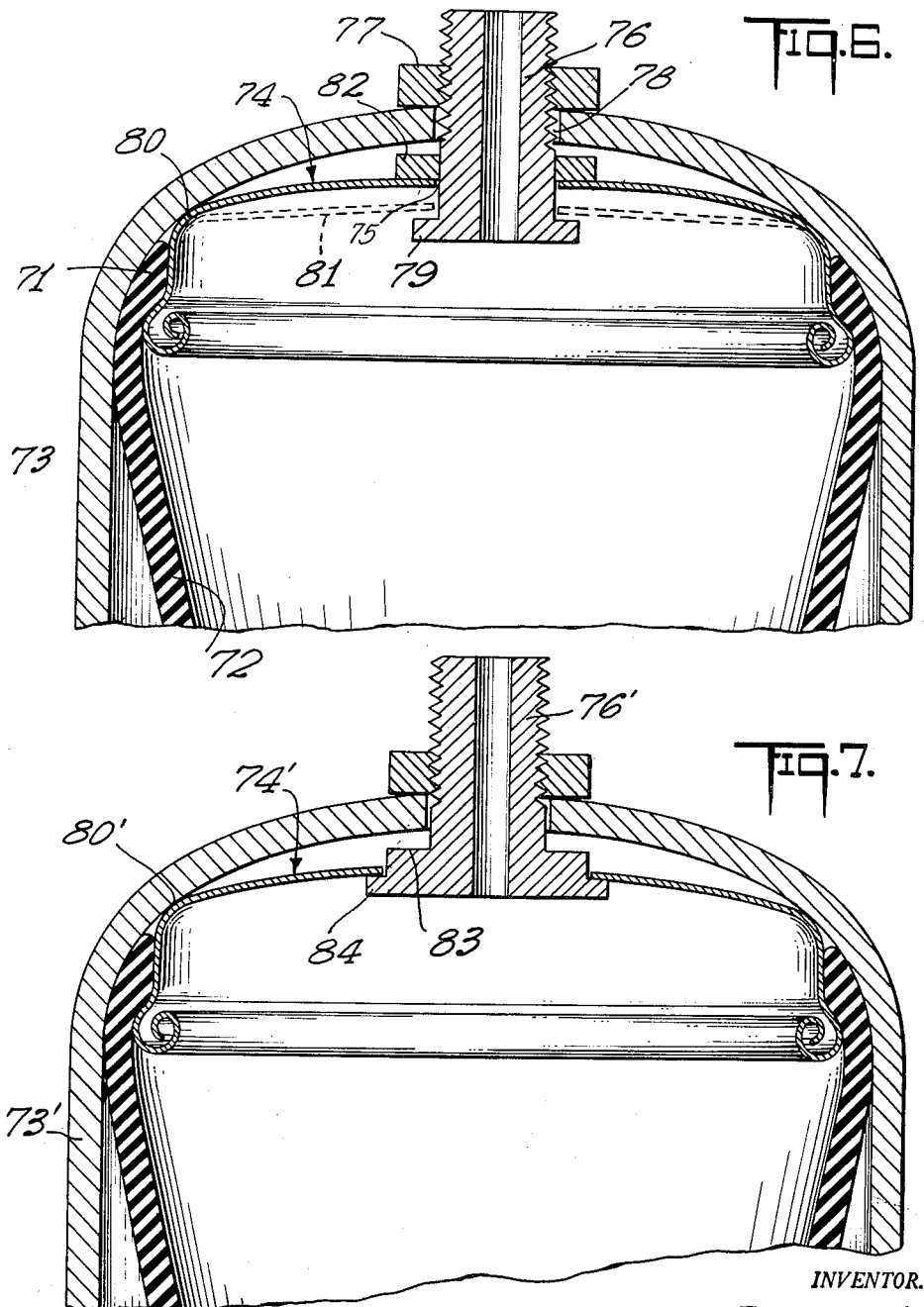
INVENTOR.
Jean Mercier
BY
ATTORNEYS 3,195,578
PRESSURE ACCUMULATOR
Jean Mercier, 1185 Park Ave., New York, N.Y.
Original application Apr. 17, 1959, Ser. No. 807,174. Divided and this application Dec. 11, 1962, Ser. No. 243,874
3 Claims. (Cl. 138—30)

It is among the objects of the invention to provide a simple and expeditious method of manufacturing pressure accumulators from relatively low cost materials without the need for precise tolerances or precision work requiring highly skilled workers.

Another object is to provide a pressure accumulator which is strong and durable and not likely to break down and which may readily be manufactured from relatively inexpensive components and may readily be disassembled for maintenance and repair.

This application is a division of copending application Serial No. 807,174, filed April 17, 1959, now abandoned.

According to the invention, these objects are accomplished by the method and arrangement and combination of elements hereinafter described and particularly recited in the claims.

In the accompanying drawings in which are shown one or more of various possible embodiments of the several features of the invention, FIGS. 1 and 2 are longitudinal sectional views of different embodiments of the invention, FIG. 3 is a fragmentary longitudinal sectional view of another embodiment of the invention, FIGS. 4 and 5 are fragmentary longitudinal sectional views of a bladder, and FIGS. 6 and 7 are views similar to FIG. 3 of other embodiments of the invention.

Referring now to the drawings, the accumulator shown in FIG. 1 desirably comprises a substantially cylindrical shell or container 11 having a gas inlet port 12 in its closed end 13.

Positioned in said container is a deformable elongated bladder 14 of natural or synthetic rubber or of plastic having like characteristics. The bladder 14 at its end 15 has an internal axial extension 16 desirably molded integral therewith, the function of which will be hereinafter described.

The bladder 14 is desirably initially molded by placing a charge of suitable material into the cavity of a mold base having an outstanding lateral recess at its upper end, placing a core in the cavity and thereupon applying heat and pressure to the mold until the bladder is formed. The core and the bladder are thereupon removed, the bladder thus formed having outwardly directed thickened bead 17 at its mouth, as shown in FIG. 4. The bladder is then reversed so that the bead 17 will then be on the inside of the bladder as shown in FIG. 5. Such construction facilitates removal of the core of the mold after the molding operation.

Although the bladder may be retained in the container in any suitable manner, as illustratively shown, the thickened bead 17 at the mouth of the bladder 14 is desirably clamped against the inner surface of end 13 of the container by means of a clamp disc 18, which preferably is resilient. The disc 18 has an axial stem 19, preferably formed integral therewith, which extends through the port 13, the stem being externally threaded as at 20 to receive a nut 21.

The disc 18 has a peripheral annular flange 22 and an outstanding projection, desirably an annulus 23, which is designed to abut against the undersurface of the closed end of the shell. In addition, an annular shoulder 24 is provided at the root end of stem 19, said shoulder having an annular groove 25 in which a resilient sealing member such as an O ring 26 is positioned, and being of height less than that of annulus 23.

To close the open end or mouth 27 of the container 11, a substantially cup-shaped cap 28 is provided having a side wall 29 of inner diameter such that it will encompass the open end 27 of the container and fit snugly thereagainst. The floor 31 of the cap desirably has a cylindrical axial extension 32 preferably formed integral therewith and defining a fluid port 33, said extension being threaded as at 34 to receive a suitable coupling (not shown). In addition, the floor has a plurality of outstanding bosses 35 on its inner surface which serve to space a perforated plate 36 from said floor 31. The plate 36 desirably is curved to conform to the curvature of the floor 31 and is of diameter slightly less than the inner diameter of the mouth of the container.

To assemble the accumulator shown in FIG. 1, the beaded mouth 17 of the bladder is positioned so that it encompasses the periphery of the disc 18 and rests on the flange 22. The resilient seal ring 26 is then positioned in annular groove 25 of shoulder 24; the stem 19 of the disc 18 is then passed through the port 12 and the nut 21 is screwed tightly on the threaded end of the stem until the annulus 23 abuts against the inner surface of the closed end of the container.

As a result, the O ring 26 will be compressed to form a seal between the stem 19 and the container and the thickened bead 17 at the mouth of the bladder will be compressed by the flange 22 against the inner surface of the container so that such beaded portion will be securely retained in position.

As the annulus is of greater height than shoulder 24, the annulus will first abut against the container to insure that the bead 17 will be securely clamped against the container to effect a dependable seal. Thereafter with further rotation of the nut 21, by reason of the resilience of the disc 18, the shoulder 24 will be moved into close juxtaposition to the container to compress the seal ring 26 to form a dependable seal.

If not for the fact that the annulus 23 is of greater height than the shoulder 24, if there should be any imperfection, such as protuberances on the inner wall of the container adjacent the air opening, and the shoulder 24 seated first, the annulus 23 might not press against the container, with the result that the bead 17 would not be tightly gripper and might come loose with resultant failure of the unit.

The end 15 of the bladder is then pushed by hand toward the disc 18 so that the axial extension 16 of the bladder passes through the bore 37 of the stem 19. The end of the extension which protrudes from the stem is then held by a suitable clamp 38 so that the lower end of the bladder will be retained adjacent the disk 18, assuming the position illustratively shown in dot and dash lines in FIG. 1.

The perforated plate 36 is then positioned so as to rest on the bosses 35 on the floor 31 of the cap 28, axially aligned with the port 33. A ring 41 of any suitable metallic bonding material such as silver solder, of diameter slightly less than the inner diameter of the container 11 is positioned on the surface of the plate 36. The cap 28 with the plate and solder ring 41 thereon is then fitted over the end 27 of the container 11 so that the side wall 29 of the cap will encompass the open end of the container and the rim 42 of such container will rest on the floor of the cap adjacent its side wall 29. A second ring 43 of solder is then positioned around the container so that it rests on the upper edge 44 of the side wall 29 as shown in FIG. 1.

A source of heat of sufficient temperature to melt the solder rings 41 and 43 is then applied to the end 27 of the container until both of the solder rings are melted. As a result, the cap 28 will be securely bonded to the side wall 29 of the container as at 45 and the plate 36 will be securely bonded to the inner wall of the container as at 46.

After the solder and the container have cooled, the clamp 38 holding the protruding end of the extension 16 is released and the bladder will thereupon drop into the container, assuming its normal form shown in full lines. A conventional gas valve (not shown) may then be screwed into the threaded bore 37 of the stem and the accumulator is then ready for use in conventional manner.

The embodiment shown in FIG. 2 is similar in many respects to that shown in FIG. 1 and corresponding parts have the same reference numerals primed.

In this embodiment port 12' in the end 13' of the container is of greater diameter than the port 12 of FIG. 1 and is sealed by means of a disc 18' and a clamp plate 51. The disc 18' has a stem 19' preferably formed integral therewith which is externally threaded as at 20'. The disc 18' is of diameter such that its top surface will engage the undersurface of the container adjacent the rim of its port 12' and the disc 18' has a peripheral flange 22' which is spaced from the adjacent inner surface of the wall of the container when the disc 18' is retained thereagainst.

The plate 51 is of heavy resilient material such as sheet metal and has an axial opening 52 through which the stem 19' extends. The plate has an outstanding side wall 53 of outer diameter slightly less than the diameter of the port 12' so that it may readily fit in such opening and said side wall 53 has a lateral flange 54 adapted to seat on the outer surface of the shell adjacent the rim of port 12'. The length of the side wall 53 is less than the thickness of the container wall at such port 12' so that the floor 55 of the plate 51 will be spaced from the disc 18' when the latter abuts against the undersurface of the container as shown in FIG. 2.

In assembling the accumulator shown in FIG. 2, the beaded mouth 17' of the bladder is positioned so that it encompasses the periphery of disc 18' and rests on the flange 22'. The disc 18' is then inserted into the container through its open end 27' so that the stem 19' extends through the port 12'. The plate 51 is then positioned so that the stem 19' extends through its opening 52 and with the flange 54 of the plate 51 resting on the outer rim of the port 12; thus centering the disc 18' and the bladder 14' in the container. A nut 21' is then screwed tightly on stem 19' causing the disc 18' and flange 54 to clamp the rim of port 12' therebetween, such clamping action also causing the beaded mouth 17' of the bladder to be clamped by the flange 22' against the container.

A conventional gas valve (not shown) which is screwed into the stem 19' is then opened and the bladder is compressed as by hand and moved upwardly. The valve is then closed retaining the end 15' of the bladder adjacent the disc 18' as shown in dot and dash lines in FIG. 2.

If desired, instead of manually compressing the bladder and moving it upwardly, suction may be applied through the open valve in the stem 19' to effect such collapse and contraction of the bladder 14'.

The end 27' of the container 11' is then closed in the manner previously described with respect to the embodiment shown in FIG. 1 and after the container and solder have cooled, the valve in stem 19' is opened so that atmospheric pressure will cause the bladder 14' to assume its normal position shown in full lines in FIG. 2.

The embodiment shown in FIG. 3 is also similar in many respects to the embodiment shown in FIGS. 1 and 2 and corresponding parts also have the same reference numerals double primed. In this embodiment, the port 12" in the container 11" is sealed by means of a disc 18" which desirably has an axial opening 58 therethrough of relatively small dimensions and is concave on its inner surface adjacent said bore as at 59. A mass of self-sealing rubber 61 of conventional type is positioned in the concavity 59 of the disc 18" and retained therein as by means of a plate 62 welded or otherwise affixed to the undersurface of the disc as at 63 and having an opening 64 therethrough aligned with the opening 58 in disc 18". The plate 62 adjacent its opening 64 is desirably concave on its inner surface, as at 65, the concave portions 59 and 65 of the disc 18" and plate 62 defining a pocket in which the mass of rubber 61 is securely retained to seal the openings 58 and 64. The disc 18" at its periphery has a flange 22" which serves to clamp the thickened bead portion 17" of the bladder 14" against the inner surface of the container securely to retain the bladder in position.

Although the disc may be retained in fixed position against the inner surface of the container adjacent the port 12" in any suitable manner, in the illustrative embodiment herein, a ring 67 of resilient material, such as sheet metal, substantially L-shaped in cross section, has one of its legs 68 affixed as by welding to the top surface of the disc 18" and its other leg 69 which preferably is split as at 71 and which normally is resiliently stressed outwardly, will clamp against the side wall of the port 12" in the container.

The pressure accumulator shown in FIG. 3 is assembled by positioning the beaded portion 17" of the bladder so that it encompasses the periphery of the disc 18" and rests on the flange 22". The disc 18" is thereupon inserted into the container and the outwardly stressed leg 69 is pressed inwardly so that it may pass through port 12" and such leg 69 is then released, securely retaining the disc 18" in position with the beaded portion 17" clamped against the inner surface of the wall of the container adjacent port 12".

A needle (not shown) having a bore therethrough is then passed through the aligned openings 58 and 64 of the disc 18" and the plate 62 and through the rubber mass 61. The bladder 14" is then compressed manually and moved toward the disc 18" and the needle is then removed so that the rubber mass 61 will seal the opening made by the passage of the needle therethrough to retain the bladder in compressed condition as shown in dot and dash lines in FIG. 3 so that its end 15" is spaced from the open end of the container 11".

If desired, instead of manually compressing the bladder, suction may be applied to the needle to achieve the same result.

The open end (not shown) of the container 11" is then closed in the manner described with respect to the embodiment shown in FIG. 1 and thereupon after the container and solder have cooled, the needle is inserted into the rubber mass 61 so that communication is afforded between the interior of the bladder 14" and the atmosphere and as a result, the bladder will expand to assume the position shown in full lines by reason of atmospheric pressure.

With the methods above described, a relatively inexpensive low pressure accumulator may be formed. As the lower end of the bladder, during the bonding operation, is moved away from the region to which heat is applied to close the lower end of the container, such lower end will suffer no injury. To open the accumulator for any purpose, such as to clean its interior to replace the bladder, heat may be applied to the lower end of the container to re-melt the metallic bonding material so that the cap is readily removable. If the bladder is not defective, by merely applying suction to the gas port in the manner previously described, the lower end of the bladder can be moved away from the soldered portion prior to the heating operation so that no injury will be imparted thereto.

In the embodiment shown in FIG. 6, the rim 71 of the bladder 72 is retained against the wall of the container 73 by a resilient clamp plate 74, the latter having a central opening 75 through which a stem 76 extends.

Thus when a nut 77 threaded on the end of the stem extending beyond the port 78 of the container 73 is tightened the flange 79 at the curved end of the stem will be moved upwardly to first compress the periphery 80 of the clamp plate 74 against the wall of the container to clamp the rim 71 of the bladder 72 therebetween.

The radius of curvature of the clamp plate 74 may be greater than that of the adjacent wall of the container as shown in full lines in FIG. 6 or the clamp plate may be substantially flat as shown in broken lines at 81.

If desired, a collar 82 may idly encompass the stem 76 as shown or be secured to the rim of the opening 75 in the clamp plate, the thickness of the collar being such that the periphery 80 of the clamp plate 74 will engage the wall of the container 73 before the collar 82 abuts against the rim of the port 78 in the container.

In the embodiment shown in FIG. 7, which is similar to that in FIG. 6, the stem 76' has an annular lateral shoulder 83 at its inner end and a flange 84 extends laterally outward from said shoulder. The height of the shoulder is such that the periphery 80' of the clamp plate 74' will engage the wall of the container 73' before the shoulder 83 abuts against the rim of the port 78 in the container 73'.

As many changes could be made in the above method and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a rigid container having a port at one end, a bladder of resilient deformable material in said container, said bladder having a mouth at one end, a resilient clamp disc having an associated stem extending through the port of said container, said disc and said stem having a passageway therethrough, said disc having an outer peripheral portion and a portion inwardly of said outer peripheral portion adapted to abut against the inner surface of the container, the rim of the mouth of the bladder being seated on said peripheral portion, means to effect outward movement of said stem through said port and to move the disc toward said inner surface of the container, to compress the rim of the mouth of the bladder between the outer peripheral portion of the disc and the inner surface of the container resiliently to retain the rim of the bladder in fixed position, said stem having an annular lateral shoulder at its inner end and a flange extending laterally outward from said shoulder, said passageway defining a central opening in said disc, said stem extending through said opening, said flange being adapted to abut against the periphery of said opening, said shoulder being of height such that the disc portion inwardly of said outer peripheral porion thereof will abut against the periphery of the container port, said disc portion inwardly of said outer peripheral portion limiting the compression of said rim, said bladder defining a chamber on each side thereof, one of said chambers being in communication with said passageway for charging of said chamber, said container having an additional port to provide access to the other chamber.

2. The combination set forth in claim 1 in which the curvature of said clamp disc is greater than the curvature of the adjacent wall of said container.

3. The combination set forth in claim 2 in which the disc portion inwardly of said outer peripheral portion when the disc is moved toward the container wall will exert a pressure against the latter greater than that exerted by the annular zone of the clamp disc inwardly of said disc portion.

References Cited by the Examiner
UNITED STATES PATENTS

| | | | |
|---|---|---|---|
| 2,123,381 | 7/38 | Reichel | 29—454 |
| 2,392,173 | 1/46 | Mercier | 18—53 |
| 2,399,879 | 5/46 | Mercier | 138—30 |
| 2,411,874 | 12/46 | Golden | 29—454 |
| 2,492,000 | 12/49 | Morris et al. | 18—53 |
| 2,550,892 | 5/51 | Weber et al. | 138—30 |
| 2,630,834 | 3/53 | Weber et al. | 138—30 |
| 2,880,759 | 4/59 | Wisman | 138—30 |
| 3,038,501 | 6/62 | Greer | 138—30 |

EDWARD V. BENHAM, *Primary Examiner.*